(No Model.)
J. B. LOTT.
VEHICLE WHEEL.
No. 460,681. Patented Oct. 6, 1891.
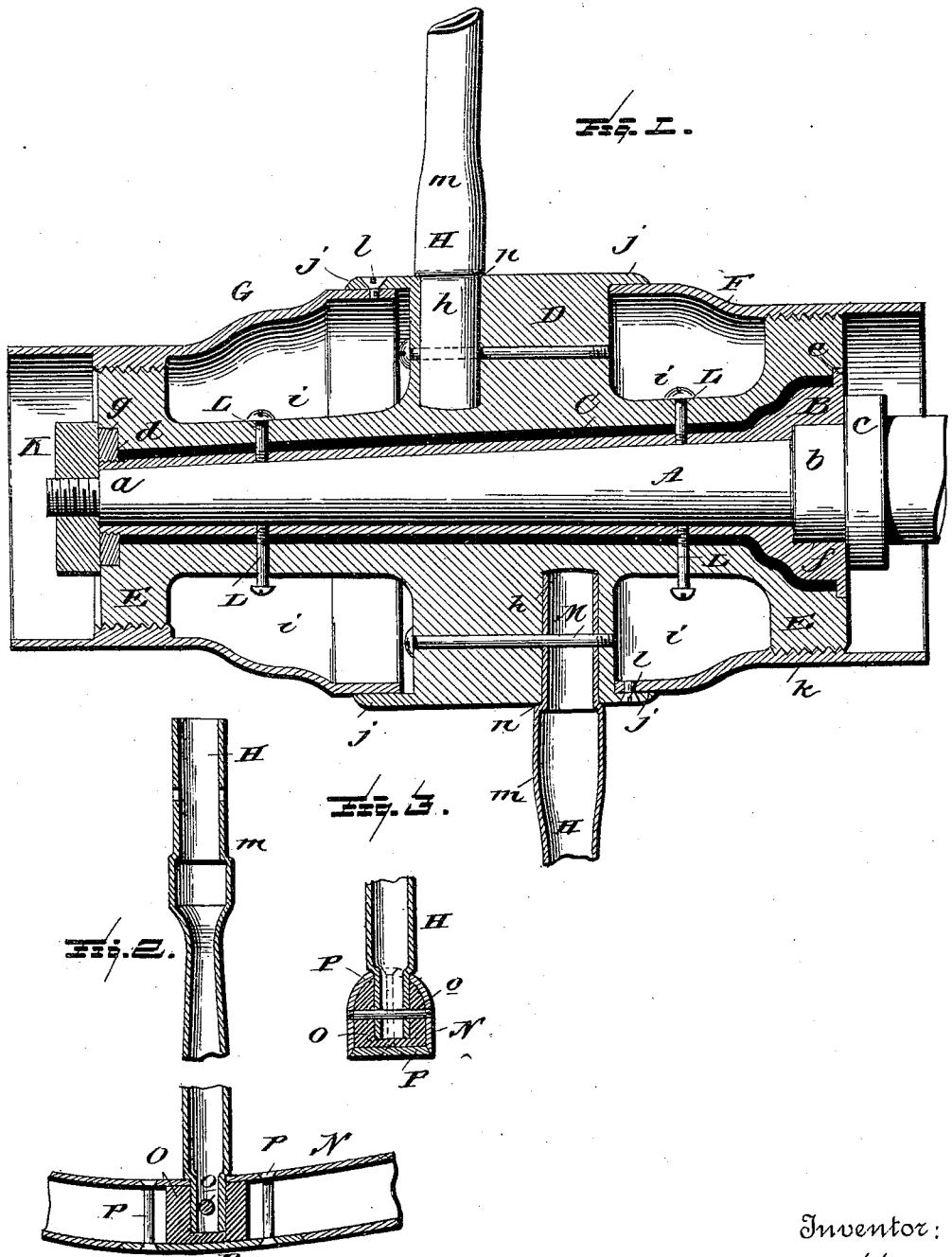
Witnesses:
L. C. Hills.
E. A. Bond
Inventor:
John B. Lott.
E. B. Stocking
Attorney
THE NORRIS PETERS CO., PHOTO-LITHO., WASHINGTON, D. C.

UNITED STATES PATENT OFFICE.

JOHN B. LOTT, OF KITTANNING, PENNSYLVANIA.

VEHICLE-WHEEL.

SPECIFICATION forming part of Letters Patent No. 460,681, dated October 6, 1891.

Application filed December 11, 1890. Serial No. 374,339. (No model.)

*To all whom it may concern:*

Be it known that I, JOHN B. LOTT, a citizen of the United States, residing at Kittanning, in the county of Armstrong, State of Pennsylvania, have invented certain new and useful Improvements in Vehicle-Wheels, of which the following is a specification, reference being had therein to the accompanying drawings.

This invention relates to certain new and useful improvements in steel vehicle-wheels, more particularly the hubs thereof and the means for securing the spokes in place.

The invention has for its objects, among others, to provide an elastic sleeve around the axle-box between the same and the hub with means for drawing the parts tightly together.

It has for a further object to secure the spokes in position by means which are inclosed within the hub, where they are concealed. I make the hub of peculiar form and screw the back band on the back part of the hub before the spokes are affixed in place. I give to the spokes a novel shape, whereby they are made more durable and less liable to work loose. I provide novel means of attaching the tire end of the spokes in place within the tire.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a central longitudinal section through a hub constructed in accordance with my invention. Fig. 2 is a section lengthwise of the spoke, with a portion of the tire also in section. Fig. 3 is a section through the tire end of a spoke at right angles to Fig. 2.

Like letters of reference indicate like parts throughout all the views.

Referring now to the details of the drawings by letter, A designates the axle-spindle, which is screw-threaded at its outer end, as shown at $a$, and near its other end formed with bosses $b$ and $c$, of different diameters, as shown in Fig. 1.

B designates the axle-box, which at its smaller end is exteriorly threaded, as shown at $d$, and at its other end is formed with an enlargement, terminating in the flange $e$, and with interior recess $f$ to receive the boss $b$ of the spindle or axle-skein, the outer surface of the enlargement being corrugated or upon curved lines, as shown in Fig. 1.

C is a rubber sleeve fitted over the axle-box for giving elasticity or resiliency. It is enlarged at the inner end to conform to the shape of the enlargement of the axle-box, its inner end abutting against the flange $e$ of said axle-box and its outer end retained by the nut $g$ on the screw-threaded portion $d$ of the outer end of the axle-box.

D is the hub or spoke-socket and lock-box, formed with central portion having spoke-sockets $h$ alternately arranged, so that the spokes shall be zigzagged, as shown in Fig. 1, and at the ends with screw-threaded annular portions $e$, being chambered or cored between the central portion and said annular portion, as shown at $i$ in Fig. 1. The central portion has overlapping flanges $j$, within which the bands F and G are designed to fit. These bands may be made as fanciful as desired, and are provided with interiorly-threaded bands $k$, designed to engage the threaded portion E of the hub, as seen in Fig. 1. The inner ends fit within the flanges $j$, and are secured thereto by screws $l$, or other analogous means, passed through the flanges and into the bands, as shown in Fig. 1, being preferably alternately arranged, as shown.

H are the spokes, which may be formed hollow or solid, as desired, and are designed to fit within the spoke-sockets of the part D, being formed with a bulge or enlargement M near their junction with the hub and with a shoulder $m$, designed to bear firmly against the outer periphery of the part D.

In practice the parts are assembled by first placing the axle-skein within the box, then placing the elastic sleeve around the box, with its inner end abutting against the flange $e$ of the box, the boss $b$ fitting in the chamber $f$ and the boss $c$ against the outer end thereof. The nut $b$ is then screwed home, fitting in the recess in the outer end of the hub D. The nut K is then placed upon the screw-threaded end of the spindle and the parts drawn tightly together and then held by the screws L, which are passed through the annular portion of the part D, through the elastic sleeve, through the box, and, if desired, bearing against the spindle. The spokes are then forced into their sockets in the part B and there secured by the screws or bolts M, arranged parallel with the spindle and passed alternately in opposite directions through the walls of the spoke-socket, as shown in Fig. 1, being inserted through the cored portion $i$ of the portion B. The bands F and G are then screwed into position and there held by the screws $l$.

It will thus be observed that I form a light, strong, and elastic hub wherein the means for securing the parts in place and the means to secure the spokes are concealed from view and protected from wear and dust and dirt. The parts are readily assembled and are not liable to work loose or get out of order.

N is the felly formed of steel pipe flattened, as shown, and perforated at suitable intervals for the reception of the tire ends of the spokes. The tire is secured thereto in any well-known way. The spokes pass through the perforations in the felly and into filling-blocks O, which are of a shape conforming to that of the interior of the felly, and the spokes and filling-blocks are secured in position by means of transverse pins $o$. (See Fig. 3.)

In order to provide for the insertion or removal of the filling-blocks, I provide the felly opposite each spoke with a removable cap P, held in position by the bolts or rivets $p$, as seen more clearly in Fig. 2, which provide for the ready removal or insertion of the blocks when occasion requires.

Various modifications in detail may be resorted to without departing from the spirit of the invention or sacrificing any of its advantages.

What I claim is—

1. In a vehicle-hub, a hub portion D, formed with spoke-sockets, exteriorly-threaded annular end portions, and cored between said end portions and the central portion, combined with the bands interiorly threaded to engage the threads of the end portions, substantially as described.

2. The combination, with the hub portion D, having central portion provided with spoke-sockets and exteriorly-threaded end portions, the central portion being provided with flanges $j$, of the bands having threaded portions to engage the threads of the end portions and their inner ends fitted within said flanges $j$, and screws connecting said flanges and band, substantially as described.

3. The combination, with the hub portion D, having spoke-sockets and cored portions, of the spokes fitted in said sockets and the securing means inserted from said cored portions through the portion D, and the bands concealing the same, substantially as described.

4. A felly formed of steel pipe flattened and having a removable cap in the flattened part opposite the spoke-socket, substantially as described.

5. The combination, with the felly flattened at its periphery and having removable cap in the flattened portion, and spoke-opening, of the filling-block, the spoke fitted therein, and the transverse means for holding the same together, substantially as described.

In testimony whereof I affix my signature in presence of two witnesses.

JOHN B. LOTT.

Witnesses:
PAUL F. KUHNE,
H. R. KUHNE.